(12) United States Patent
Knapp et al.

(10) Patent No.: US 9,682,890 B2
(45) Date of Patent: Jun. 20, 2017

(54) LOW THERMAL EXPANSION CERAMIC BODIES CONTAINING A BENITOITE-TYPE PHASE

(71) Applicant: Corning Incorporated, Corning, NY (US)

(72) Inventors: Karen Jo Knapp, Addison, NY (US); Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/915,961

(22) PCT Filed: Sep. 3, 2014

(86) PCT No.: PCT/US2014/053772
§ 371 (c)(1),
(2) Date: Mar. 2, 2016

(87) PCT Pub. No.: WO2015/076895
PCT Pub. Date: May 28, 2015

(65) Prior Publication Data

US 2016/0221877 A1    Aug. 4, 2016

Related U.S. Application Data

(60) Provisional application No. 61/874,690, filed on Sep. 6, 2013.

(51) Int. Cl.
C04B 33/00    (2006.01)
C04B 35/16    (2006.01)
C04B 38/00    (2006.01)

(52) U.S. Cl.
CPC .............. *C04B 33/00* (2013.01); *C04B 35/16* (2013.01); *C04B 38/00* (2013.01); *C04B 2235/3215* (2013.01); *C04B 2235/3232* (2013.01); *C04B 2235/3244* (2013.01); *C04B 2235/3293* (2013.01); *C04B 2235/349* (2013.01); *C04B 2235/6567* (2013.01); *C04B 2235/76* (2013.01); *C04B 2235/761* (2013.01); *C04B 2235/77* (2013.01); *C04B 2235/80* (2013.01); *C04B 2235/96* (2013.01); *C04B 2235/9607* (2013.01)

(58) Field of Classification Search
CPC ...................................................... C04B 35/16
See application file for complete search history.

(56) References Cited

PUBLICATIONS

Bordun et al.; "Luminescence of Thin Bismuth Germanate Films Having the Structure of Eulitine and Benitoite"; Journal of Applied Spectroscopy, vol. 72, No. 3, 2005; pp. 403-406.
Bordun et al.; "Thermally Stimulated Luminescence of Bismuth Germanate Ceramics with the Benitoite, Eulitine, and Sillenite Structures"; Journal of Applied Spectroscopy, vol. 75, No. 3, 2008; pp. 379-384.
Iwasaki et al.; "Blue Photoluminescence, greenish-blue afterglow and their TI-concentration dependence in rare earth-free bazirite-type BaZr1—xTixSi3O9"; Optics Express, vol. 17, No. 20 (Sep. 28, 2009); pp. 1-9.

(Continued)

*Primary Examiner* — Karl Group
(74) *Attorney, Agent, or Firm* — Russell S. Magaziner (57) ABSTRACT

Ceramic materials and ceramic bodies are disclosed herein, such as low thermal expansion ceramic materials or ceramic bodies, such as ceramic bodies comprising a benitoite-type phase.

39 Claims, 4 Drawing Sheets

(56) References Cited

PUBLICATIONS

Iwasaki et al.; "Photoluminescence in Bazirite Crystal by Addition of Impurity Ions"; Key Engineering Materials, vol. 445 (2010); pp. 221-224.

M.K. Murthy; "Thermal-Expansion Properties of BaTiGe3O9"; Journal of the American Ceramic Society—Discussions and Notes, vol. 45, No. 11; p. 566.

Rase et al.; "Phase Equilibria in the System BaTiO3—SiO2"; Journal of The American Ceramic Society, vol. 38, No. 11; pp. 389-395.

Takahashi et al.; "Formation of Ba2TiGe2O8 phase in BaO—TiO2—GeO2 glasses and their optical non-linearities"; Journal of Non-Crystalline Solids 345 & 346 (2004); pp. 412-416.

Takahashi et al.; "Photouminescence in mineral-derived titanosilicates with various Ti-polyhedral types for rare-earth free phosphor"; Phys. Status Solidi C 9, No. 12 (2012); pp. 2336-2339.

Udagawa et al.; Thermal Expansion of Benitoite (BaTiSi3O9); The Ceramic Society of Japan; vol. 81 (1973) No. 935; pp. 310-311.

Choisnet et al.; "Sur de nouveaux germanates et silicates de type benitoite=New germanates and silicates of benitoite type"; Journal of Solid State Chemistry, Orlando, FL, US, vol. 4, No. 2 (Mar. 1, 1972); pp. 209-218.

Choisnet et al.; "Spectres vibrationnels des silicates et germanates renfermant des anneaux. M309 (M û; Si, Ge)—I. Attribution des frequences caractéristiques de l'anneau M309, dans les composés de type bénitoïte, wadéite et tétragermanate=Vibrational spectra of silicates and germanates of ring form, M309 (M="; Spectrochimica Acta. Part A: Molecular Spectroscopy, vol. 31, No. 8 (Jan. 1, 1975); pp. 1023-1034.

European Patent Office; International Search Report and Written Opinion; Mail Date: Sep. 1, 2015.

V. G. Chukhlantsev and Yu. M. Galkin; "Study of the BaO—ZrO2—SiO2 Sytem at Subsolidus Temperatures"; Doklady Chemical Technology (Engl. Transl.), 169 [3] (1966); pp. 128-130.

Choisnet et al.; "Contribution à l' etude des silicates et germinates substitués de type bénitoite"; C.R.ACAD. SC. Paris, V.270 (Mar. 16, 1970); Series C. pp. 1003-1006.

LOW THERMAL EXPANSION CERAMIC BODIES CONTAINING A BENITOITE-TYPE PHASE

This application claims the benefit of priority under 35 U.S.C. §371 of International Patent Application Serial No. PCT/US14/53772, filed on Sep. 3, 2014, which claims the benefit of priority under 35 U.S.C. §119 of U.S. Provisional Application Ser. No. 61/874,690, filed on Sep. 6, 2013, the contents of which are relied upon and incorporated herein by reference in their entireties.

FIELD

The present specification generally relates to ceramic materials or ceramic bodies, such as low thermal expansion ceramic materials or ceramic bodies, such as ceramic bodies comprising a benitoite-type phase.

BACKGROUND

Ceramic materials can be used in high-temperature applications that are subject to thermal gradients.

SUMMARY

Disclosed herein are low thermal expansion ceramic materials or ceramic bodies, such as ceramic bodies comprising a benitoite-type phase.

In some embodiments, the ceramic bodies are microcracked ceramic bodies comprising one or more phases of which at least one phase is a cyclosilicate or cyclogermanate compound whose crystal structure is isostructural with that of the mineral benitoite and belongs to the space group $P\bar{6}m2$. The benitoite-structure phase is preferably of the composition $BaZr_xTi_ySn_zSi_3O_9$, wherein $0 \le x \le 1$, $0 \le y \le 1$, $0 \le z \le 1$, and $x+y+z=1$.

In some embodiments, the ceramic body exhibits a low coefficient of thermal expansion; in some of these embodiments, the mean coefficient of thermal expansion from 25 to 1000° C. is not more than $40 \times 10^{-7}$° $C.^{-1}$ and preferably not more than $15 \times 10^{-7}$° $C.^{-1}$. Such embodiments can be useful in applications requiring a structural material having a high thermal shock resistance.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Disclosed herein are microcracked ceramic bodies comprising one or more phases of which at least one phase is a cyclosilicate or cyclogermanate compound whose crystal structure is isostructural with that of the mineral benitoite and belongs to the space group $P\bar{6}m2$, and which exhibits a mean CTE of not more than $40 \times 10^{-7}$° $C.^{-1}$ along one direction within the ceramic body.

The benitoite-structure compound has the general formula $MM'M''_3O_9$, wherein M comprises barium and, optionally, one or more elements selected from the group consisting of strontium, lead, and calcium; M' comprises one or more elements selected from the group consisting of zirconium, titanium, tin, hafnium, silicon, and cerium; and M" comprises one or more elements selected from the group consisting of silicon and germanium. The silicon and germanium atoms are each bonded to four oxygen atoms which are located at the corners of a tetrahedron, and the $(Si,Ge)O_4$ tetrahedra are linked to one another at the corners to form isolated three-member rings in the crystal structure. In some embodiments, a portion of the divalent M cations may be replaced with potassium or rubidium in combination with a trivalent element such as lanthanum, cerium, neodymium, gadolinium, yttrium, or indium. In some embodiments, a portion of the divalent M cations may be replaced with potassium or rubidium while an equal portion of the tetravalent M' cations are replaced with a pentavalent cation of an element such as niobium or tantalum to maintain charge balance.

In some embodiments, the ceramic comprises one or more phases having a benitoite-type structure and having a composition within the $BaZrSi_3O_9$—$BaTiSi_3O_9$—$BaSnSi_3O_9$ system. When the ceramic body comprises two phases having a benitoite-type structure, one of the phases is of the general composition $Ba(Zr_aTi_bSn_c)Si_3O_9$, where $0 \le a \le 1$, $0 \le b \le 0.5$, $0 \le c \le 1$, and $a+b+c=1$, while the other phase is of the general composition $Ba(Zr_dTi_eSn_f)Si_3O_9$, where $0 \le d \le 0.4$, $0.6 \le e \le 1$, $0 \le f \le 0.4$, and $d+e+f=1$.

Figure 1:
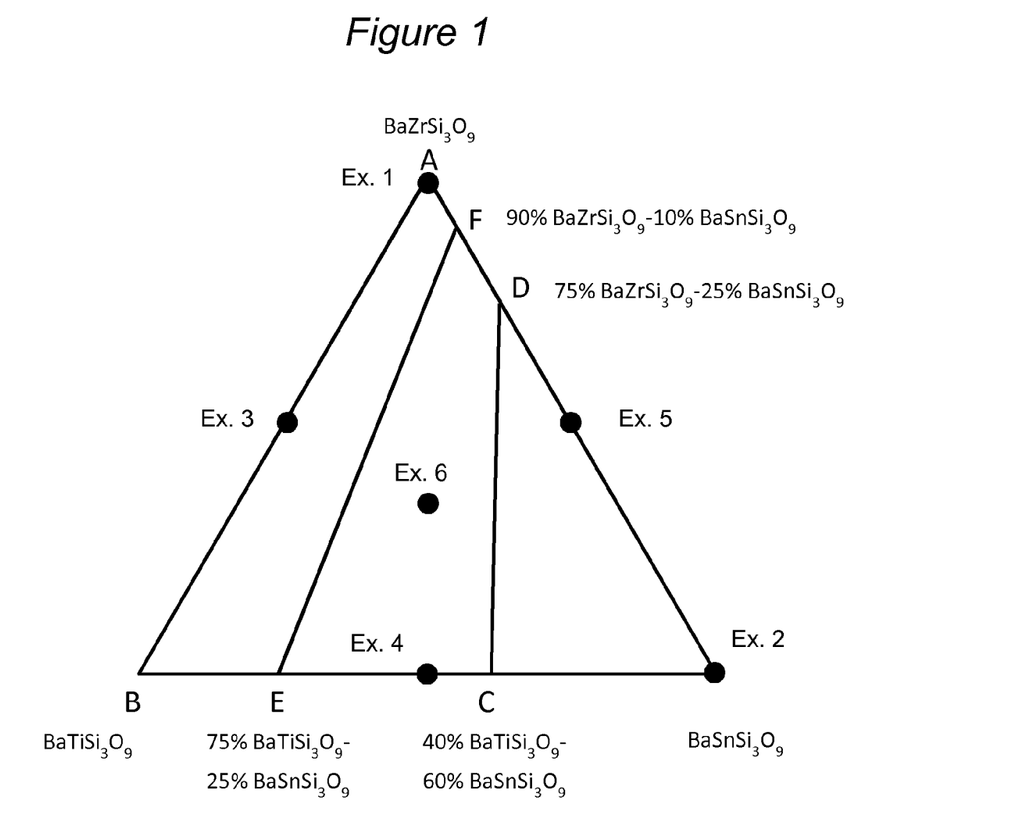
FIG. 1 schematically illustrates compositions in the $BaZrSi_3O_9$—$BaTiSi_3O_9$—$BaSnSi_3O_9$ system on a mole percent basis; the nominal bulk compositions of Examples 1 to 6, below, are indicated by the filled circles. Compositional regions A-B-C-D and A-B-E-F are also shown, together with their bulk compositions.

In some embodiments, the ceramic comprises one or more phases having a benitoite-type structure wherein the molar weighted average composition of all benitoite-type structure phases in the ceramic lies within the region A-B-C-D in the $BaZrSi_3O_9$—$BaTiSi_3O_9$—$BaSnSi_3O_9$ system in FIG. 1. It is even more preferred that the molar weighted average composition of all benitoite-type structure phases lies within the region A-B-E-F in FIG. 1. Ceramics satisfying these relationships have especially low coefficients of thermal expansion and high thermal shock resistance. The weighted molar average composition of the benitoite structure-type phases is calculated given by $Ba(Zr_gTi_hSn_i)Si_3O_9$ where $g=[(X_1)(a)+(X_2)(d)]/(X_1+X_2)$, $h=[(X_1)(b)+(X_2)(e)]/(X_1+X_2)$, and $I=[(X_1)(c)+(X_2)(f)]/(X_1+X_2)$ and where $X_1$ is the mole fraction of the benitoite structure-type phase $Ba(Zr_aTi_bSn_c)Si_3O_9$ in the ceramic and $X_2$ is the mole fraction of benitoite structure-type phase $Ba(Zr_dTi_eSn_f)Si_3O_9$ in the ceramic. Either $X_1$ or $X_2$ may equal zero, in which case the ceramic contains only a single benitoite structure-type phase.

In some embodiments, the mean coefficient of thermal expansion from room temperature to 1000° C., $CTE_{RT-1000}$, along at least one spatial dimension of the ceramic body is not more than $35 \times 10^{-7 \circ}$ C.$^{-1}$, in some of these embodiments not more than $30 \times 10^{-7 \circ}$ C.$^{-1}$, in some of these embodiments not more than $25 \times 10^{-7 \circ}$ C.$^{-1}$, in some of these embodiments not more than $20 \times 10^{-7 \circ}$ C.$^{-1}$, in some of these embodiments not more than $15 \times 10^{-7 \circ}$ C.$^{-1}$, and in some of these embodiments not more than not more than $10 \times 10^{-7 \circ}$ C.

In some embodiments, the ceramic body exhibits a value of $E_{1000° C.}/E_{RT}$ of at least 1.0, where E is Young's elastic modulus measured by a sonic resonance technique along a spatial dimension of the ceramic body, $E_{RT}$ is measured at room temperature, and $E_{1000° C.}$ is measured at 1000° C. upon heating the sample. A value of $E_{1000° C.}/E_{RT} > 1.0$ indicates the presence of microcracking in the ceramic body, which is beneficial for the reduction of CTE. In some embodiments, the value of $E_{1000° C.}/E_{RT}$ is at least 1.5, in some of these embodiments at least 2.0, in some of these embodiments at least 3.0, and in some of these embodiments at least least 4.0.

In some embodiments, the ceramic body comprises 10 to 100% of the benitoite-structure phase. In some embodiments, the benitoite-structure phase comprises less than 100% of the ceramic body, and the ceramic body comprises up to 90% of one or more phases selected from the group comprising $ZrO_2$ and its crystalline solutions, $ZrSiO_4$ (zircon), $Ba_2Si_3O_8$, $BaSi_2O_5$, $BaSi_4O_{10}$, $Ba_2TiSi_2O_8$, $Ba_2Zr_2Si_3O_{12}$, $BaTiSi_2O_7$, $BaZr_4P_6O_{24}$ and its crystalline solutions, $BaAl_2Si_2O_8$, $SrAl_2Si_2O_8$, $Al_6Si_2O_{13}$ (mullite), $TiO_2$ and its crystalline solutions, $SnO_2$ and its crystalline solutions, $ZrTiO_4$ and its crystalline solutions including $(Zr_aTi_bSn_c)O_4$ where $a+b+c=1$.

Tables 1 and 2 show eleven examples as disclosed herein. For each of the six compositions listed in the tables, a 500-gram mixture of barium carbonate, fused silica soot, and one or more of zirconium oxide, titanium oxide, and tin (IV) oxide was prepared. To this was added 25 grams of polyethylene glycol (400 molecular weight) and sufficient methanol to form a slurry. The slurry was then ball milled for 72 hours using zirconia milling media. The slurry was then dried for 1 hour in a rotary evaporator with the water bath set at 90° C., followed by 24 hours in an oven at 90° C. A portion of the dried powder mixture was uni-axially pressed into 2.5×0.25×0.25 inch bars at approximately 10000 psi. Bars were heated in air at 100° C./h to either 1250, 1350, or 1450° C. and held for 83 or 100 hours before cooling. During firing, the raw materials reacted with one another to form a ceramic body of sintered grains of the benitoite structure-type phase. The nominal compositions of the fired ceramic bodies are expressed as weight percentages of the constituent oxides in Tables 1 and 2.

TABLE 1

Compositions and properties of examples disclosed herein

| | Example Number | | | |
|---|---|---|---|---|
| | 1A | 1B | 2A | 2B |
| Nominal Bulk Composition | $BaZrSi_3O_9$ | $BaZrSi_3O_9$ | $BaSnSi_3O_9$ | $BaSnSi_3O_9$ |
| Wt % BaO | 33.57 | 33.57 | 31.66 | 31.66 |
| Wt % $ZrO_2$ | 26.97 | 26.97 | 0.00 | 0.00 |
| Wt % $TiO_2$ | 0.00 | 0.00 | 0.00 | 0.00 |
| Wt % $SnO_2$ | 0.00 | 0.00 | 31.12 | 31.12 |
| Wt % $SiO_2$ | 39.46 | 39.46 | 37.22 | 37.22 |
| Firing temperature (° C.) | 1450 | 1350 | 1350 | 1250 |
| Hold time (hours) | 100 | 100 | 100 | 100 |
| Major phase(s) | $BaZrSi_3O_9$ | $BaZrSi_3O_9$ | $BaSnSi_3O_9$ | $BaSnSi_3O_9$ |
| "a" unit cell length (Å) | 6.764 | 6.767 | 6.730 | 6.730 |
| "c" unit cell length (Å) | 10.002 | 10.010 | 9.847 | 9.848 |
| Minor phase(s) | — | $Ba_3Zr_2Si_3O_{12}$ | $BaSi_4O_{10}$ | — |
| Trace phase(s) | $Ba_3Zr_2Si_3O_{12}$ | $BaSi_4O_{10}$ | $SnO_2$ | $SnO_2$ |
| | | $BaSi_2O_5$ | | $BaSi_4O_{10}$ |
| | | Cristobalite | | |
| | | $ZrO_2$ | | |
| $CTE_{RT-800° C.}$ ($10^{-7 \circ}$ C.$^{-1}$) | 9.5 | 15.5 | 27.4 | 28.0 |
| $CTE_{RT-1000° C.}$ ($10^{-7 \circ}$ C.$^{-1}$) | 13.2 | 18.0 | 29.8 | 30.0 |
| % Porosity | 45.3 | — | — | — |
| MOR (psi) | 157 | — | — | — |
| $E_{RT}$ (psi) | 2.80E+05 | — | — | — |
| $E_{1000° C.}$ (psi) | 1.18E+06 | — | — | — |
| MOR (1 − ν)/E at 25° C. | 505 × $10^{-6}$ | — | — | — |
| Predicted Thermal Shock Quench Limit (° C.) | 652 | — | — | — |

TABLE 2

Compositions and properties of additional examples disclosed herein

| | Example Number | | | |
|---|---|---|---|---|
| | 3 | 4A | 4B | 5A |
| Nominal Bulk Composition | $BaZr_{0.5}Ti_{0.5}Si_3O_9$ | $BaSn_{0.5}Ti_{0.5}Si_3O_9$ | $BaSn_{0.5}Ti_{0.5}Si_3O_9$ | $BaZr_{0.5}Sn_{0.5}Si_3O_9$ |
| Wt % BaO | 35.24 | 34.16 | 34.16 | 32.59 |
| Wt % $ZrO_2$ | 14.16 | 0.00 | 0.00 | 13.09 |
| Wt % $TiO_2$ | 9.17 | 8.89 | 8.89 | 0.00 |
| Wt % $SnO_2$ | 0.00 | 16.79 | 16.79 | 16.01 |
| Wt % $SiO_2$ | 41.43 | 40.16 | 40.16 | 38.31 |
| Firing temperature (° C.) | 1250 | 1350 | 1250 | 1450 |
| Hold time (hours) | 100 | 100 | 100 | 83 |
| Major phase(s) | $(BaZrSi_3O_9)_{ss}$ | $(BaSnSi_3O_9)_{ss}$ | $(BaSnSi_3O_9)_{ss}$ | $Ba(Zr,Sn)Si_3O_9$ |
| "a" unit cell length (Å) | 6.736 | 6.714 | 6.696 | 6.746 |
| "c" unit cell length (Å) | 9.953 | 9.832 | 9.811 | 9.923 |
| | $(BaTiSi_3O_9)_{ss}$ | $(BaTiSi_3O_9)_{ss}$ | $(BaTiSi_3O_9)_{ss}$ | |
| "a" unit cell length (Å) | pending | pending | pending | |
| "c" unit cell length (Å) | pending | pending | pending | |
| Minor phase(s) | $Ba_2TiSi_2O_8$ | $Ba_2TiSi_2O_8$ | $Ba_2TiSi_2O_8$ | |
| Trace phase(s) | Tridymite Cristobalite | Tridymite Cristobalite $SnO_2$ | Tridymite Cristobalite $SnO_2$ | |
| $CTE_{RT\text{-}800° C.}$ ($10^{-7°}$ $C.^{-1}$) | 5.5 | 15.9 | 21.8 | 32.4 |
| $CTE_{RT\text{-}1000° C.}$ ($10^{-7°}$ $C.^{-1}$) | 8.6 | 19.0 | 24.0 | 32.7 |

| | Example Number | | |
|---|---|---|---|
| | 5B | 6A | 6B |
| Nominal Bulk Composition | $BaZr_{0.5}Sn_{0.5}Si_3O_9$ | $BaZr_{0.33}Sn_{0.33}Ti_{0.33}Si_3O_9$ | $BaZr_{0.33}Sn_{0.33}Ti_{0.33}Si_3O_9$ |
| Wt % BaO | 32.59 | 33.95 | 33.95 |
| Wt % $ZrO_2$ | 13.09 | 9.10 | 9.10 |
| Wt % $TiO_2$ | 0.00 | 5.89 | 5.89 |
| Wt % $SnO_2$ | 16.01 | 11.13 | 11.13 |
| Wt % $SiO_2$ | 38.31 | 39.93 | 39.93 |
| Firing temperature (° C.) | 1350 | 1350 | 1250 |
| Hold time (hours) | 100 | 100 | 100 |
| Major phase(s) | $Ba(Zr,Sn)Si_3O_9$ | $(Ba(Zr,Sn)Si_3O_9)_{ss}$ | $(Ba(Zr,Sn)Si_3O_9)_{ss}$ |
| "a" unit cell length (Å) | 6.745 | 6.737 | 6.719 |
| "c" unit cell length (Å) | 9.917 | 9.908 | 9.879 |
| | | $(BaTiSi_3O_9)_{ss}$ | |
| "a" unit cell length (Å) | | pending | |
| "c" unit cell length (Å) | | pending | |
| Minor phase(s) | $Ba_3Zr_2Si_3O_{12}$ | — | — |
| Trace phase(s) | — | $Ba_2TiSi_2O_8$ | $Ba_2TiSi_2O_8$ |
| | $SnO_2$ Cristobalite | — | Cristobalite |
| $CTE_{RT\text{-}800° C.}$ ($10^{-7°}$ $C.^{-1}$) | 29.0 | 17.9 | 27.4 |
| $CTE_{RT\text{-}1000° C.}$ ($10^{-7°}$ $C.^{-1}$) | 30.5 | 20.0 | 29.4 |

Powder x-ray diffractometry was conducted on a pulverized portion of one of the fired bars for each example. The major, minor, and trace phases are listed in Tables 1 and 2. Also listed are the a and c unit cell parameters of the benitoite structure-type phases in the examples for those cases in which they could be derived by Rietveld refinement of the XRD data.

The percentage of porosity in the fired ceramic bar for Example 1A was estimated by weighing the bar to determine its mass, measuring the dimensions of the bar to compute its volume, dividing the mass by the volume to derive the density, and dividing the computed density by the density of a $BaZrSi_3O_9$ crystal, taken to be 3.82 g $cm^{-3}$.

Figure 2:
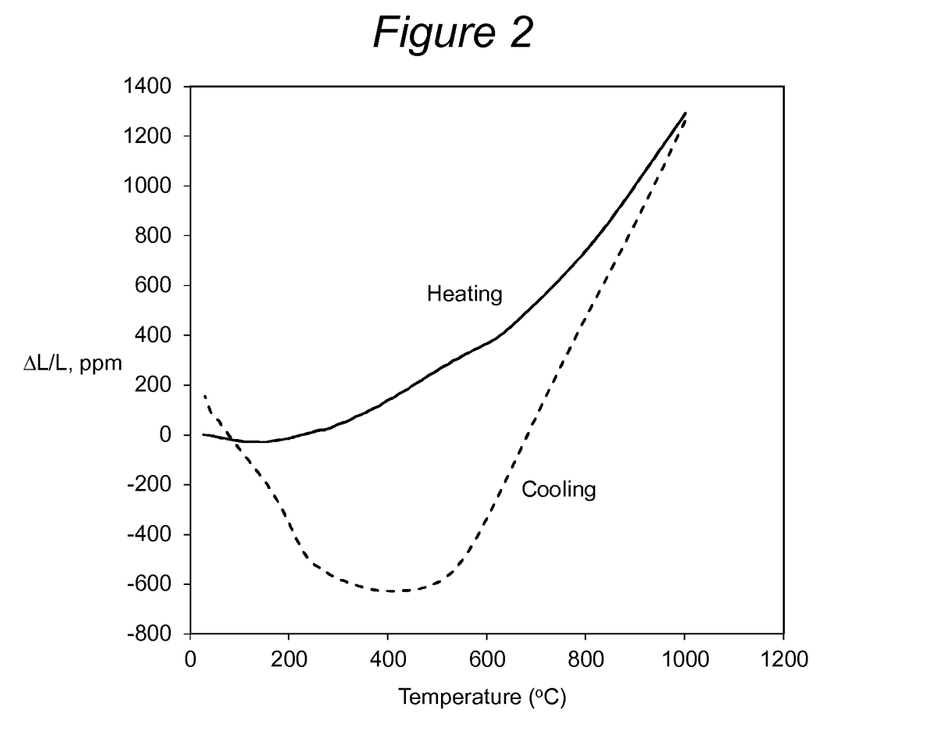
FIG. 2 schematically depicts depicts the relative length change, $\Delta L/L$, of Example 1A, below, as measured by dilatometry from room temperature to 1000° C. (solid curve) and back to room temperature (dashed curve). The hysteresis in length change with temperature (gap between the heating and cooling curves) indicates the presence of substantial microcracking in the ceramic.

The thermal expansion of a ceramic bar of each example was measured by dilatometry from room temperature to 1000° C. and back to room temperature. The resulting relative length changes, $\Delta L/L$, during heating and cooling are shown in FIG. 2 for Example 1A and in FIG. 3 for Example 3. The mean coefficient of thermal expansion parallel to the length of the bar from room temperature to 1000° C. was calculated from the relation $CTE_{RT\text{-}1000° C.} = (\Delta L/L)_{1000° C.}/(\Delta T)$ where $(\Delta L/L)_{1000° C.}$ is the relative length change of the sample as measured at 1000° C. and $\Delta T$ is difference between 1000° C. and room temperature and is taken to be 975° C. The large difference in the relative length change at a given temperature between the heating and cooling cycles indicates a substantial degree of microcracking in the ceramic body. This microcracking contributes to the low CTE of the ceramic material.

Figure 3:
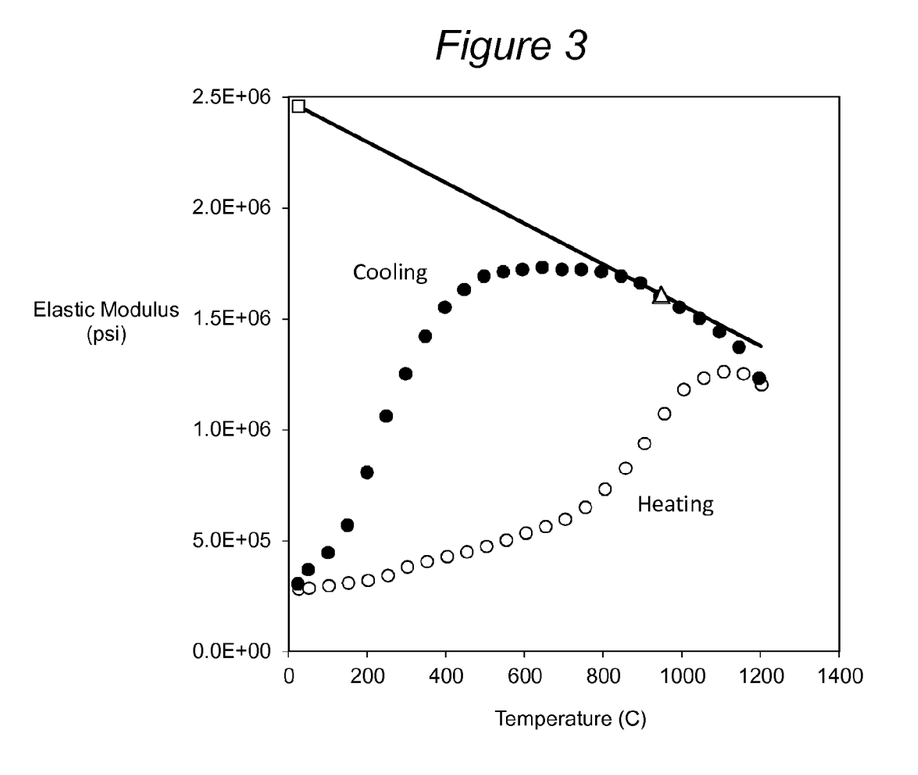
FIG. 3 shows the change in Young's elastic modulus of Example 1A, below, as measured by sonic resonance at 50° C. intervals from room temperature to 1200° C. (open circles) and back to room temperature (filled circles). The hysteresis in elastic modulus with temperature indicates the presence of substantial microcracking in the ceramic. Line drawn tangent to the cooling curve at the point designated by the open triangle is extrapolated back to a point at room temperature which approximates the value of the elastic modulus of the ceramic in a non-microcracked state at room temperature (open square).
Figure 4:
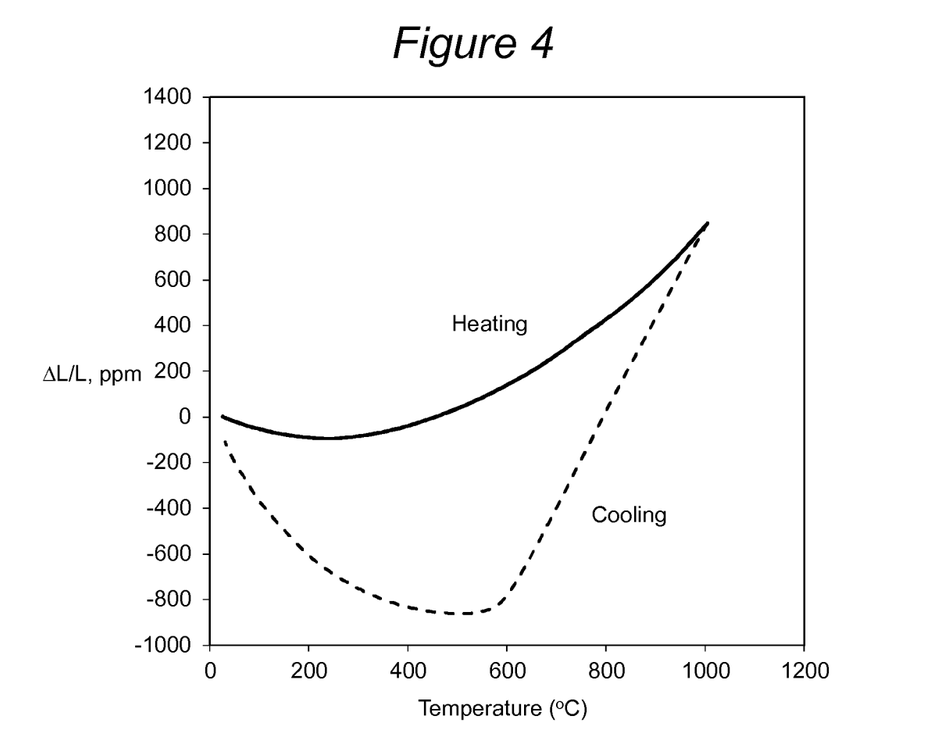
FIG. 4 depicts the relative length change, $\Delta L/L$, of Example 3, below, as measured by dilatometry from room temperature to 1000° C. (solid curve) and back to room temperature (dashed curve). The hysteresis in length change with temperature indicates the presence of substantial microcracking in the ceramic.

The Young's elastic modulus of Example 1A was measured by a sonic resonance technique at 50° C. intervals from room temperature to 1200° C. and back to room temperature, see FIG. 3. The substantial hysteresis between the elastic modulus heating and cooling curves signifies a high degree of microcracking in the sample at room temperature. The ratio of the elastic modulus at 1000° C. to that at room temperature is proportional to the extent of microcracking in the sample.

The modulus of rupture (flexural strength) of Example 1A was measured by the four-point method. The result shown in Table 1 is the average of the strengths measured on five bars.

The predicted thermal shock quench limit of Example 1A is an estimate of the maximum temperature to which a sample of Example 1A could be heated and then plunged into room-temperature water without fracturing. This temperature was derived by first estimating the strain tolerance of the ceramic as being equal to MOR(1−ν)/E, where MOR and E are the room-temperature values of flexural strength and Young's elastic modulus, and ν is the Poisson's ratio of the ceramic, assumed to equal 0.10 for this porous, highly-microcracked material. This value, $505 \times 10^{-6}$ (505 ppm), represents the strain at failure for the ceramic. To determine the thermal shock quench limit for this sample, the value of 505 ppm was added to the value of ΔL/L at the lowest point on the thermal expansion cooling, which is −806 ppm, occurring at 400° C., in FIG. 2. The resulting value of ΔL/L is −301 ppm. The position on the thermal expansion cooling curve which corresponds to −301 ppm occurs at 652° C. In other words, a ceramic bar of Example 1A, if heated to 652° C. and held at that temperature to thermally equilibrate the sample, and then plunged into room-temperature water, would undergo a small amount of fracturing on the surface as the surface temperature passed below 400° C. while the interior of the sample was still at about 652° C. The strain between the surface and center of the sample would be 505 ppm, just sufficient to initiate fracture.

Referring to Tables 1 and 2, values of $CTE_{RT-1000°\ C.}$ below $35 \times 10^{-7}$ $C.^{-1}$ can be achieved for a wide range of ceramics comprised of one or two benitoite structure-type phases when reaction sintered at 1250-1450° C. from precursor raw materials. Low values of $CTE_{RT-1000°\ C.}$, less than $30 \times 10^{-7}$ $C.^{-1}$, are obtained for ceramic compositions which lie within the region A-B-C-D in FIG. 1. Especially low values of $CTE_{RT-1000°\ C.}$, less than $20 \times 10^{-7}$ $C.^{-1}$ and even less than less than $10 \times 10^{-7}$ $C.^{-1}$, are obtained for Examples 1 and 3, which lie within the region A-B-E-F in FIG. 1.

In some embodiments, ceramic materials, or ceramic bodies, are disclosed herein that (1) exhibit high melting points (liquidus temperatures), in some cases >1450° C.; (2) are thermodynamically stable, enabling their use at high temperatures for prolonged periods of time; and (3) have low coefficients of thermal expansion. Such ceramic materials have potential use in high-temperature applications requiring thermal shock resistance and thermal stability. The absence of magnesium and sodium in these ceramics may be beneficial in applications in which magnesium or sodium would have a detrimental effect on the performance of an applied catalyst.

In some embodiments, ceramic materials, or ceramic bodies, are disclosed herein that comprise a phase with a bazirite-type crystal structure, which is stable above 1000° C., and which has a CTE of less than $40 \times 10^{-7}$ $C.^{-1}$ from room temperature to 1000° C.; such a material could be useful in certain high-temperature applications requiring thermal shock resistance.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A microcracked ceramic body comprising one or more phases, wherein at least one phase is a cyclosilicate or cyclogermanate compound whose crystal structure is isostructural with that of mineral benitoite and belongs to space group P6̄m2.

2. The microcracked ceramic body of claim 1 wherein the at least one phase that is a cyclosilicate or cyclogermanate compound comprises the composition $BaZr_xTi_ySn_zSi_3O_9$, wherein 0≤x≤1, 0≤y≤1, 0≤z≤1, and x+y+z=1.

3. The microcracked ceramic body of claim 1, wherein micro-cracks in the ceramic body contribute to low coefficient of thermal expansion such that the ceramic body exhibits a mean coefficient of thermal expansion from 25 to 1000° C. of not more than $40 \times 10^{-7}$ $C.^{-1}$.

4. The microcracked ceramic body of claim 3, wherein the mean coefficient of thermal expansion from 25 to 1000° C. is no more than $15 \times 10^{-7}$ $C.^{-1}$.

5. A microcracked ceramic body, comprising:
a compound having a crystal structure isostructural with that of mineral benitoite and of a formula $MM'M''_3O_9$, wherein M comprises one or more elements selected from the group consisting of strontium, lead, calcium, and barium; wherein M' comprises one or more elements selected from the group consisting of zirconium, titanium, tin, hafnium, silicon, and cerium; and wherein M'' comprises one or more elements selected from the group consisting of silicon and germanium; and
micro-cracks in the ceramic body contributing to low coefficient of thermal expansion such that the ceramic body exhibits a mean coefficient of thermal expansion over temperatures ranging from 25 to 1000° C. of not more than $40 \times 10^{-7}$ $C.^{-1}$.

6. The microcracked ceramic body of claim 5, wherein M comprises barium.

7. The microcracked ceramic body of claim 5, wherein M'' comprises silicon.

8. The microcracked ceramic body of claim 5, wherein silicon and/or germanium atoms of M'' are bonded to four oxygen atoms located at corners of a tetrahedron.

9. The microcracked ceramic body of claim 8, wherein $(Si,Ge)O_4$ tetrahedra are linked to one another at the corners to form isolated three-member rings in crystal structure of the microcracked ceramic body.

10. A microcracked ceramic body, comprising:
one or more phases having a crystal structure isostructural with that of mineral benitoite and having a composition within a $BaZrSi_3O_9$—$BaTiSi_3O_9$—$BaSnSi_3O_9$ system, where $BaZrSi_3O_9$, $BaTiSi_3O_9$, and $BaSnSi_3O_9$ are boundary points that define a compositional space for the system covering $BaZrSi_3O_9$, $BaTiSi_3O_9$, $BaSnSi_3O_9$, and combinations thereof; and
micro-cracks in the ceramic body contributing to low coefficient of thermal expansion such that the ceramic body exhibits a mean coefficient of thermal expansion over temperatures ranging from 25 to 1000° C. of not more than $40 \times 10^{-7}$ $C.^{-1}$.

11. The microcracked ceramic body of claim 10, wherein the one or more phases more specifically comprise at least two phases having crystal structure isostructural with that of mineral benitoite.

12. The microcracked ceramic body of claim 11, wherein one of the phases having crystal structure isostructural with that of mineral benitoite is $Ba(Zr_aTi_bSn_c)Si_3O_9$, where 0≤a≤1, 0≤b≤0.5, 0≤c≤1, and a+b+c=1.

13. The microcracked ceramic body of claim 12, wherein at least another of the phases having crystal structure isostructural with that of mineral benitoite is $Ba(Zr_dTi_eSn_f)Si_3O_9$, where $0 \leq d \leq 0.4$, $0.6 \leq e \leq 1$, $0 \leq f \leq 0.4$, and $d+e+f=1$.

14. The microcracked ceramic body of claim 10, wherein the one or more phases having a crystal structure isostructural with that of mineral benitoite that include at least one of:
   a structure of $Ba(Zr_aTi_bSn_c)Si_3O_9$, where $0 \leq a \leq 1$, $0 \leq b \leq 0.5$, $0 \leq c \leq 1$, and $a+b+c=1$; and
   a structure of $Ba(Zr_dTi_eSn_f)Si_3O_9$, where $0 \leq d \leq 0.4$, $0.6 \leq e \leq 1$, $0 \leq f \leq 0.4$, and $d+e+f=1$.

15. The microcracked ceramic body of claim 14, wherein, in the $BaZrSi_3O_9$—$BaTiSi_3O_9$—$BaSnSi_3O_9$ system, the boundary point $BaZrSi_3O_9$ is defined as point A, the boundary point $BaTiSi_3O_9$ is defined as point B, a combination of 40% $BaTiSi_3O_9$ and 60% $BaSnSi_3O_9$ in molar weight is defined as point C, and a combination of 75% $BaZrSi_3O_9$ and 25% $BaSnSi_3O_9$ in molar weight is defined as point D,
   wherein a molar weighted average composition of all phases having a crystal structure isostructural with that of mineral benitoite in the compositional space of the system of the microcracked ceramic body lies within a region of the system defined by points A, B, C, and D, where weighted molar average composition of the phases having a crystal structure isostructural with that of mineral benitoite is calculated given by $Ba(Zr_gTi_hSn_i)Si_3O_9$ where $g=[(X_1)(a)+(X_2)(d)]/(X_1+X_2)$, $h=[(X_1)(b)+(X_2)(e)]/(X_1+X_2)$, and $i=[(X_1)(c)+(X_2)(f)]/(X_1+X_2)$ and where $X_1$ is the mole fraction of the phase of $Ba(Zr_aTi_bSn_c)Si_3O_9$ in the ceramic and $X_2$ is the mole fraction of phase of $Ba(Zr_dTi_eSn_f)Si_3O_9$ in the ceramic.

16. The microcracked ceramic body of claim 15, wherein in the $BaZrSi_3O_9$—$BaTiSi_3O_9$—$BaSnSi_3O_9$ system a combination of 75% $BaTiSi_3O_9$ and 25% $BaSnSi_3O_9$ in molar weight is defined as point E, and a combination of 90% $BaZrSi_3O_9$ and 10% $BaSnSi_3O_9$ in molar weight is defined as point F,
   wherein the molar weighted average composition of all phases having a crystal structure isostructural with that of mineral benitoite in the compositional space of the system of the microcracked ceramic body lies within a region of the system defined by points A, B, E, and F.

17. The microcracked ceramic body of claim 10, having a high melting point, that being greater than 1450° C.

18. A microcracked ceramic body, comprising:
   a compound of a formula $MM'M''_3O_9$, wherein M comprises one or more elements selected from the group consisting of strontium, lead, calcium, and barium; wherein M' comprises one or more elements selected from the group consisting of zirconium, titanium, tin, hafnium, silicon, and cerium; and wherein M" comprises one or more elements selected from the group consisting of silicon and germanium; and
   micro-cracks in the ceramic body contributing to low coefficient of thermal expansion such that the ceramic body exhibits a mean coefficient of thermal expansion over temperatures ranging from 25 to 1000° C. of not more than $40 \times 10^{-7}$ °C.$^{-1}$.

19. The microcracked ceramic body of claim 18, wherein M comprises barium.

20. The microcracked ceramic body of claim 18, wherein M" comprises silicon.

21. The microcracked ceramic body of claim 18, wherein silicon and/or germanium atoms of M" are bonded to four oxygen atoms located at corners of a tetrahedron.

22. The microcracked ceramic body of claim 21, wherein $(Si,Ge)O_4$ tetrahedra are linked to one another at the corners to form isolated three-member rings in crystal structure of the microcracked ceramic body.

23. A microcracked ceramic body, comprising:
   one or more phases having a composition within a $BaZrSi_3O_9$—$BaTiSi_3O_9$—$BaSnSi_3O_9$ system, where $BaZrSi_3O_9$, $BaTiSi_3O_9$, and $BaSnSi_3O_9$ are boundary points that define a compositional space for the system covering $BaZrSi_3O_9$, $BaTiSi_3O_9$, $BaSnSi_3O_9$, and combinations thereof; and
   micro-cracks in the ceramic body contributing to low coefficient of thermal expansion such that the ceramic body exhibits a mean coefficient of thermal expansion over temperatures ranging from 25 to 1000° C. of not more than $40 \times 10^{-7}$ °C.$^{-1}$.

24. The microcracked ceramic body of claim 23, wherein the one or more phases more specifically comprise at least two phases.

25. The microcracked ceramic body of claim 24, wherein one of the phases comprises $Ba(Zr_aTi_bSn_c)Si_3O_9$, where $0 \leq a \leq 1$, $0 \leq b \leq 0.5$, $0 \leq c \leq 1$, and $a+b+c=1$.

26. The microcracked ceramic body of claim 25, wherein at least another of the phases comprises $Ba(Zr_dTi_eSn_f)Si_3O_9$, where $0 \leq d \leq 0.4$, $0.6 \leq e \leq 1$, $0 \leq f \leq 0.4$, and $d+e+f=1$.

27. The microcracked ceramic body of claim 23, wherein the one or more phases comprises at least one of:
   a structure of $Ba(Zr_aTi_bSn_c)Si_3O_9$, where $0 \leq a \leq 1$, $0 \leq b \leq 0.5$, $0 \leq c \leq 1$, and $a+b+c=1$; and
   a structure of $Ba(Zr_dTi_eSn_f)Si_3O_9$, where $0 \leq d \leq 0.4$, $0.6 \leq e \leq 1$, $0 \leq f \leq 0.4$, and $d+e+f=1$.

28. The microcracked ceramic body of claim 27, wherein, in the $BaZrSi_3O_9$—$BaTiSi_3O_9$—$BaSnSi_3O_9$ system, the boundary point $BaZrSi_3O_9$ is defined as point A, the boundary point $BaTiSi_3O_9$ is defined as point B, a combination of 40% $BaTiSi_3O_9$ and 60% $BaSnSi_3O_9$ in molar weight is defined as point C, and a combination of 75% $BaZrSi_3O_9$ and 25% $BaSnSi_3O_9$ in molar weight is defined as point D,
   wherein a molar weighted average composition of all phases in the compositional space of the system of the microcracked ceramic body lies within a region of the system defined by points A, B, C, and D, where weighted molar average composition of the phases is calculated given by $Ba(Zr_gTi_hSn_i)Si_3O_9$ where $g=[(X_1)(a)+(X_2)(d)]/(X_1+X_2)$, $h=[(X_1)(b)+(X_2)(e)]/(X_1+X_2)$, and $i=[(X_1)(c)+(X_2)(f)]/(X_1+X_2)$ and where $X_1$ is the mole fraction of the phase of $Ba(Zr_aTi_bSn_c)Si_3O_9$ in the ceramic and $X_2$ is the mole fraction of phase of $Ba(Zr_dTi_eSn_f)Si_3O_9$ in the ceramic.

29. The microcracked ceramic body of claim 23, having a high melting point, that being greater than 1450° C.

30. A microcracked ceramic body, comprising:
   a compound of a formula $MM'M''_3O_9$, wherein M comprises one or more elements selected from the group consisting of strontium, lead, calcium, and barium; wherein M' comprises one or more elements selected from the group consisting of zirconium, titanium, tin, hafnium, silicon, and cerium; and wherein M" comprises one or more elements selected from the group consisting of silicon and germanium; and
   micro-cracks in the ceramic body.

31. The microcracked ceramic body of claim 30, wherein M comprises barium.

32. The microcracked ceramic body of claim 30, wherein M" comprises silicon.

33. The microcracked ceramic body of claim 30, wherein silicon and/or germanium atoms of M" are bonded to four oxygen atoms located at corners of a tetrahedron.

34. The microcracked ceramic body of claim 33, wherein $(Si,Ge)O_4$ tetrahedra are linked to one another at the corners to form isolated three-member rings in crystal structure of the microcracked ceramic body.

35. A microcracked ceramic body, comprising:
one or more phases having a composition within a $BaZrSi_3O_9$—$BaTiSi_3O_9$—$BaSnSi_3O_9$ system, where $BaZrSi_3O_9$, $BaTiSi_3O_9$, and $BaSnSi_3O_9$ are boundary points that define a compositional space for the system covering $BaZrSi_3O_9$, $BaTiSi_3O_9$, $BaSnSi_3O_9$, and combinations thereof; and
micro-cracks in the ceramic body.

36. The microcracked ceramic body of claim 35, wherein the one or more phases more specifically comprise at least two phases.

37. The microcracked ceramic body of claim 36, wherein one of the phases comprises $Ba(Zr_aTi_bSn_c)Si_3O_9$, where $0 \leq a \leq 1$, $0 \leq b \leq 0.5$, $0 \leq c \leq 1$, and $a+b+c=1$.

38. The microcracked ceramic body of claim 37, wherein at least another of the phases comprises $Ba(Zr_dTi_eSn_f)Si_3O_9$, where $0 \leq d \leq 0.4$, $0.6 \leq e \leq 1$, $0 \leq f \leq 0.4$, and $d+e+f=1$.

39. The microcracked ceramic body of claim 35, wherein the one or more phases comprises at least one of:
a structure of $Ba(Zr_aTi_bSn_c)Si_3O_9$, where $0 \leq a \leq 1$, $0 \leq b \leq 0.5$, $0 \leq c \leq 1$, and $a+b+c=1$; and
a structure of $Ba(Zr_dTi_eSn_f)Si_3O_9$, where $0 \leq d \leq 0.4$, $0.6 \leq e \leq 1$, $0 \leq f \leq 0.4$, and $d+e+f=1$.

* * * * *